Figure 1:
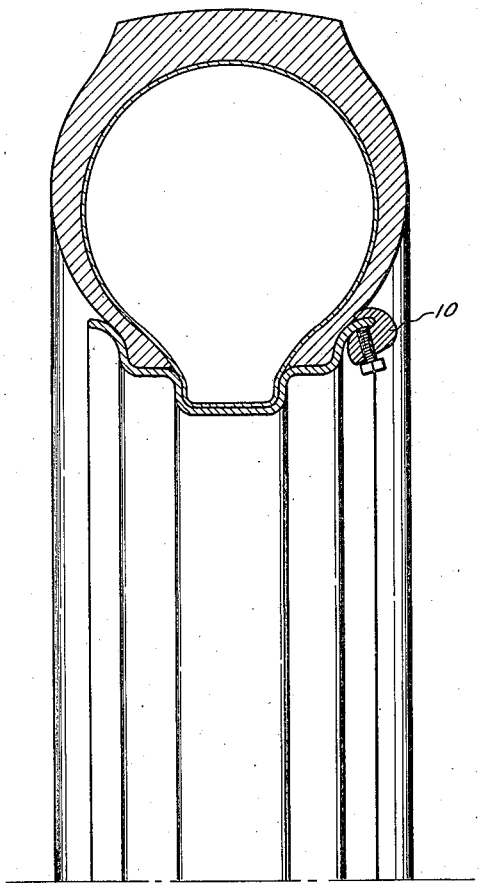

Aug. 4, 1936.  J. W. HUME  2,049,703

WHEEL BALANCER

Filed Dec. 27, 1933

Inventor
James W. Hume
By Lawrence P. Beaman
Attorney

Patented Aug. 4, 1936

2,049,703

UNITED STATES PATENT OFFICE 2,049,703

WHEEL BALANCER

James W. Hume, Jackson, Mich.

Application December 27, 1933, Serial No. 704,201

5 Claims. (Cl. 301—5)

The present invention relates to improvements in wheel balancers particularly designed for the balancing of pneumatic tired wheels upon automotive vehicles.

As in the structure disclosed in my application Serial No. 645,504, filed December 3, 1932, of which this is a continuation-in-part, the invention resides in a balance weight which is designed to embrace or straddle the edge of the tire retaining flange of the rim of the wheel. The balance weight in the preferred form has a relatively thin lip portion which is clamped against the inner side of the flange and which may or may not be engaged by the side wall of the tire depending upon the length and flare of the flange and the length of the lip. A relatively heavy body portion provides the required weight and is contiguous with the outside of the flange adjacent the edge. A set screw or equivalent means is located in the body portion to clamp the lip upon the flange and to permit the balance weight to be removably secured anywhere along the flange of the rim. According to the illustrated embodiment of the present invention the set screw is not centrally located as in the above identified application but is located adjacent one end of the body to clamp the balance weight with a three point engagement upon the curvilinear flange. This arrangement of the set screw overcomes any tendency for the balance weight to be twisted off the curvilinear flange of the rim upon the tightening of the set-screw and prevents possible loosening of the balance weight by rocking.

Other objects and advantages of the invention will be set forth in the detailed description to follow. The invention is set forth in the appended claims.

Figure 2:
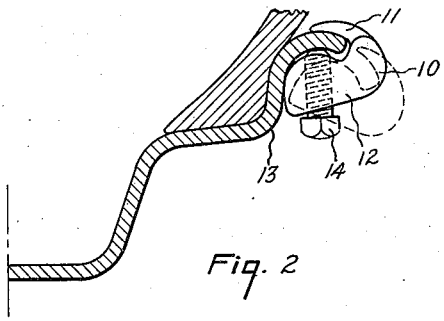
Figure 3:
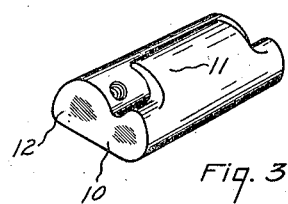
Figure 4:
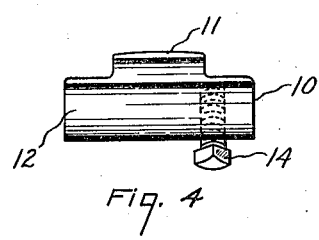
Figure 5:
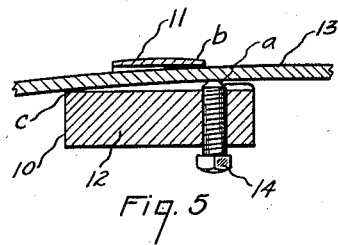
Figure 6:
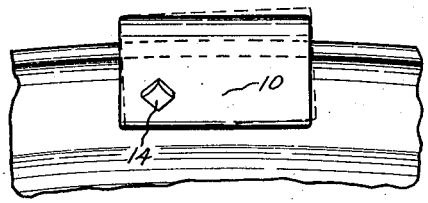

In the drawing,

Fig. 1 is a cross-sectional view through the tire, rim and weight showing the relationship of each, Fig. 2 is a cross-sectional view through a rim section having a prominent flared flange with the balance weight attached thereto and spaced from the side wall of the tire, Fig. 3 is a perspective view of the balance weight with the set screw removed, Fig. 4 is a front elevation of the balance weight showing the relative position of the set screw and lip, Fig. 5 is a cross-sectional view taken on line 5—5 of Fig. 2 showing the three point engagement with the rim flange, and Fig. 6 is a bottom view of Fig. 2 of a portion of the rim showing the balance weight attached.

For convenience and economy in the manufacture of my improved balance weight, the same are preferably cast from a non-ferrous metal, for example, as of brass, in straight elongated bars and are then severed into the several units. In view of this fact the balance weights are cast with plane surfaces and do not have the curvilinearity of the rim flange although conforming substantially to the cross-sectional contour of the flange adjacent the edge thereof. Moreover, in order that the balance weights be adaptable to rim flanges of varying degrees of thickness, the clearance between the body and overhanging lip may be such in some installation as to permit the balance weight to be rocked upon the flange when clamped with only a two point contact as disclosed in the above mentioned application although the lip may have the same curvilinearity as the flange. Furthermore, as it is of considerable advantage to market a balance weight attachable to the flange of rim varying greatly in diameter, it has been discovered in practice that upon rims of certain diameters that the location of the set screw centrally of the body and lip sometimes resulted in the balance weight being twisted or rolled off the edge of the flange upon the tightening of the set screw.

According to the present invention the objectionable features residing in the structure of my earlier application have been completely overcome by merely locating the set screw adjacent one end of the weight and longitudinally spaced from the lip. In the design of rim flanges it is the usual practice to provide a flange of curvilinear section as shown in Figs. 1 and 2. The balance weight 10 is preferably constructed with a lip 11 and body 12 having opposed surfaces conforming substantially to the curvilinearity of the rim flange adjacent the edge. The lip 11 and body 12 are spaced to provide just sufficient clearance to permit the balance weight to be readily inserted upon the edge of the rim flange through a rolling or partial rotating movement in a radial plane. In other words, the balance weight 10 in Fig. 2 can not be moved from rim flange 13 by a horizontal movement to the right, even with the set screw 14 loosened, but must be rolled or rotated clockwise off the edge of the flange as indicated by the dotted line representation in Fig. 2. From this it should be apparent that the set or jam screw 14 threaded in the body 12 performs two functions. It clamps the lip 11 upon the flange and also prevents the balance weight from being rolled or rotated clockwise off the edge of the flange. With such construction, the balance weight can only be removed from the flange by a very definite movement. For this reason, during use only rarely will a force be so directed as to place any appreciable stress upon the set screw 14 as all attempted removal other than in a direction circumferential of the rim or with a definite rolling or rotating in a radial plane are resisted by the structure of the balance weight itself.

As more clearly shown in Figs. 3 and 4, the lip 11 is preferably located centrally of the body 12 and of considerable less longitudinal extent as to avoid any more deflection of the side wall of the tire than is necessary in the event the balance weight is used upon the type of rim flange shown in Fig. 1. The set screw 14 is illustrated as located entirely to one side of the lip 11. With this arrangement, when the screw is tightened upon the flange 13 at $a$, the balance weight 10 is fulcrumed about a point $b$ into rigid contact with the underside of the flange at $c$. The tightening of the set screw has a tendency to slightly rock the balance weight 10 upon the flange to the dotted position shown in Fig. 6; the movement being in substantially a horizontal plane with reference to Fig. 2. This rocking action of the balance weight carries the body portion into rigid contact with the flange 13 as at $c$ giving a three point engagement and completely overcoming any tendency for the balance weight to rock upon the flange or to be twisted off upon tightening of the set screw as is possible under certain conditions with the screw located centrally.

The method of balancing the unbalanced force in the tire and wheel through the selective attachment of one or more of the balance weights along the rim flange should be readily apparent and is described at length in my application heretofore mentioned as well as in my co-pending application, Ser. No. 704,203, filed December 27, 1933, covering the method of balancing.

One important feature of the present invention resides in the provision of a balance weight which has a single lip portion which is clamped by a single set or jam screw, or equivalent means, with a three point engagement upon the rim flange. Another important feature of the invention resides in the coaction and means of attachment of the balance weight upon the rim flange which make necessary the rotation or rolling of the same in order to be applied or removed. This feature was shown but not specifically described or claimed in my earlier co-pending application heretofore mentioned.

The foregoing described structure is merely illustrative of the invention and although the same has been described with specific detail it has been done for the purpose of portraying a clear understanding of the contribution made and not for the purpose of limiting the invention to the particular structure shown. Thus such changes and modifications as would occur to those skilled in the art and fall within the scope of the appended claims are considered within the scope of my invention.

Having described my invention what I claim as new and desire to protect by Letters Patent is:

1. A balance weight adapted to be attached to the tire retaining flange of a pneumatic tired vehicle wheel comprising an elongated body portion, a centrally disposed overhanging lip portion integral with said body portion, said portions being sufficiently spaced to receive the edge of said flange, an adjustable clamping member located in said body portion adjacent one end and spaced longitudinally of said lip for clamping said lip upon said flange.

2. A balance weight adapted to be attached to the tire retaining flange of a pneumatic tired vehicle wheel comprising an elongated body portion, an overhanging lip portion associated with said body portion, said portions being sufficiently spaced to receive the edge of said flange, and adjustable clamping means located in said body and engageable with said flange at a point longitudinally spaced from said lip whereby said weight is fulcrumed about said lip into three point contact with said flange.

3. A balance weight adapted to be attached to the tire retaining flange of a pneumatic tired vehicle wheel comprising spaced rigid portions between which the edge of said flange is adapted to be received, one end of one of said portions constituting an abutment, an adjustable clamping member located adjacent the other end, said other portions constituting a fulcrum and being located between said abutment and member whereby upon adjustment of said member into contact with said flange the weight is urged into three point contact with said flange.

4. A balance weight adapted to be attached to the tire retaining flange of a pneumatic tired vehicle wheel comprising spaced rigid surfaces between which the edge of said flange is adapted to be received, one of said surfaces presenting a fixed abutment and an adjustable abutment engageable with one side of said flange, the other of said surfaces presenting a fixed abutment between said first abutments constituting a fulcrum engageable with the other side of said flange, whereby upon manipulation of said adjustable abutment the balance weight is clamped upon said flange with three point engagement.

5. In combination a vehicle wheel comprising a rim having spaced tire retaining flanges of curvilinear section adjacent the edges thereof, a balance weight for balancing said wheel removably secured to and straddling the edge of one of said flanges, said weight comprising an elongated body portion having a centrally located overhanging lip portion, the opposed surfaces of said portions conforming substantially to the curvilinearity of the inner and outer sides of said flange adjacent the edge, the spacing of said surface making it necessary to partially rotate said weight in a radial plane to insert upon or to remove the same from said flange, an adjustable clamping member located in said body and longitudinally spaced from said lip portion, said member upon being manipulated to clamp said lip upon said flange causing said weight to be partially rotated in a plane substantially normal to said radial plane to urge a portion of said body into engagement with said flange.

JAMES W. HUME.